(12) United States Patent
Lavian

(10) Patent No.: US 6,170,015 B1
(45) Date of Patent: Jan. 2, 2001

(54) NETWORK APPARATUS WITH JAVA CO-PROCESSOR

(75) Inventor: Tal I. Lavian, Sunnyvale, CA (US)

(73) Assignee: Nortel Networks Limited, Montreal (CA)

( * ) Notice: Under 35 U.S.C. 154(b), the term of this patent shall be extended for 0 days.

(21) Appl. No.: 09/080,143

(22) Filed: May 15, 1998

(51) Int. Cl.$^7$ .................................................. G06F 13/00
(52) U.S. Cl. ........................ 709/232; 709/223; 709/224; 709/235; 709/238
(58) Field of Search .................................... 709/220, 221, 709/223, 224, 225, 230, 232, 233, 234, 235, 238, 242, 250

(56) References Cited

U.S. PATENT DOCUMENTS

| 5,668,857 | * | 9/1997 | McHale | 379/93.07 |
| 5,696,764 | * | 12/1997 | Soumiya et al. | 370/395 |
| 5,742,606 | * | 4/1998 | Iliadis et al. | 370/413 |
| 5,832,232 | * | 11/1998 | Danneels | 709/235 |
| 5,892,932 | * | 4/1999 | Kim | 710/131 |
| 5,898,669 | * | 4/1999 | Shimony et al. | 370/232 |
| 5,963,620 | * | 10/1999 | Frankel et al. | 379/93.05 |
| 5,982,778 | * | 11/1999 | Mangin et al. | 370/445 |
| 5,983,269 | * | 11/1999 | Mattson et al. | 709/221 |

* cited by examiner

Primary Examiner—Viet Vu
(74) Attorney, Agent, or Firm—Blakely Sokoloff Taylor & Zafman LLP

(57) ABSTRACT

A method and apparatus for automatically configuring a network switch having external network data ports, a processor, memory, data bus, and coprocessor. Network data is monitored on the external network data port. Information about the network data traffic is compared to one or more threshold conditions. The network switch is automatically configured by the coprocessor if the network data meets one of the threshold conditions. The monitor and configuration functions can be performed by software running on the coprocessor which has been downloaded from an external network maintenance station through a maintenance data port. Information about the network data traffic can be uploaded to the external network maintenance station through a maintenance data port.

16 Claims, 9 Drawing Sheets

NETWORK APPARATUS WITH JAVA CO-PROCESSOR

FIELD OF THE INVENTION

This invention relates generally to data communications networks, and more particularly, to a method and apparatus for automatically configuring a network switch with a coprocessor.

BACKGROUND OF THE INVENTION

Computer networks are used to interconnect many computing resources, including computers, workstations, servers, printers, modems, and storage devices. For example, two or more computers may be connected together through a network. Network users are able to share files, printers and other resources, send messages and run applications on remote computers. An important part of any computer network includes the physical components or network communications devices used to interconnect the computing resources.

One network communications device used to interconnect multiple computing resources is a chassis-based system designed to accommodate a number of internal cards. The computing resources such as computers are coupled to the internal cards of the chassis-based system. Once the computers are coupled to the internal cards, the computers are coupled to the network. To accommodate network growth, additional internal cards may be purchased and added to the chassis-based system. With the additional internal cards installed, additional computing resources may be added to the network. A disadvantage of these chassis-based systems is that there is a relatively large initial investment when purchasing the chassis because of the large amount of overhead associated with chassis-based systems.

An alternative to expensive chassis-based systems is the use of less expensive standalone network communications devices or units that have a fixed number of ports for connecting computing resources or stations to the network. Such standalone network communications devices include stackable switches or the like. Although additional ports can not be added to each individual standalone unit, separate standalone units can be stacked, cascaded or coupled to accommodate network growth. As a result, there is a lower startup cost when establishing a computer network with the standalone units in comparison with chassis-based systems. Furthermore, network administrators still have the flexibility to increase the size of the network with the less-expensive standalone units.

FIG. 1 illustrates multiple network communications devices 103, 105, 107, 109 and 111 coupled together to form a computer network 101. Multiple computing resources (not shown) are coupled to each network communications device 103, 105, 107, 109 and 111. In one embodiment, network communications devices 103, 105, 107, 109 and 111 are stackable switches coupled together through bus 113. Bus 113 is used to tie together the switch network fabric of computer network 101. It are noted by one of ordinary skill in the art that the utilization of bus 113 is an extension of the chassis-based designs discussed earlier. The internal cards of the chassis-based systems are commonly coupled to high speed buses within the chassis-based systems.

The use of stackable switches allows network administrators to build systems having multiple physical ports to various computing resources on the network. Different types of network use patterns may typically be handled most efficiently by different configurations of a network switch. Currently, a network administrator must manually monitor and analyze network traffic patterns, and also manually make any changes to the configuration of a network switch through the use of an external network maintenance station (NMS). Although some network switches may have data gathering and reporting capabilities, a network administrator must still take a considerable amount of time to analyze the network traffic pattern and manually reconfigure the switch. Delays in rerouting network traffic are directly related to the time required to analyze network traffic and reconfigure a network switch by a network administrator.

Therefore, there is a need for a way to automatically monitor and configure a network switch according to changes in network traffic. There is a further need to automatically configure a network switch which does not reduce the flow of data through the switch.

SUMMARY OF THE INVENTION

The present invention provides a method and apparatus for automatically configuring a network switch having external network data ports, a processor, memory, data bus, and coprocessor. Network data is monitored on the external network data port. Information about the network data traffic is compared to one or more threshold conditions. The network switch is automatically configured by the coprocessor if the network data meets one of the threshold conditions. The monitor and configuration functions can be performed by software running on the coprocessor which has been downloaded from an external network maintenance station through a maintenance data port. Information about the network data traffic can be uploaded to the external network maintenance station through a maintenance data port.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF A PREFERRED EMBODIMENT OF THE PRESENT INVENTION

Figure 1:
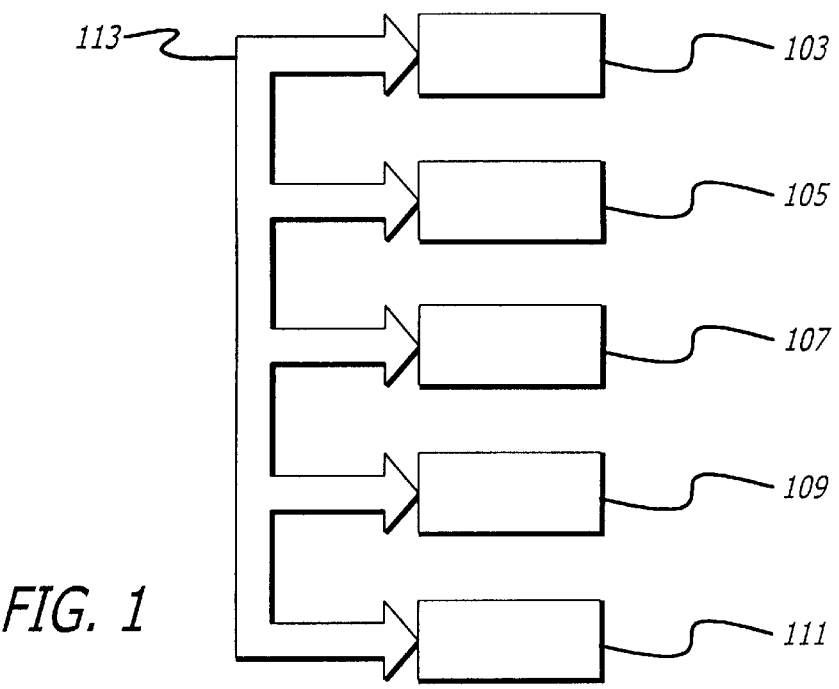
FIG. 1 shows a computer network coupled together with a bus architecture compatible with the present invention.

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides for a method and apparatus for automatically configuring a network switch having external network data ports, a processor, memory, data bus, and coprocessor. Network data is monitored on the external network data port. Information about the network data traffic is compared to one or more threshold conditions. The network switch is automatically configured by the coprocessor if the network data meets one of the threshold conditions. The monitor and configuration functions can be performed by software running on the coprocessor which has been downloaded from an external network maintenance station through a maintenance data port. Information about the network data traffic can be uploaded to the external network maintenance station through a maintenance data port.

For the purpose of illustration, one embodiment of present invention is described below in the context of a Java virtual machine in a Java development environment. Information and specifications relating to the Java development environment are described in the document "Java Virtual Machine Specification", October, 1997, Sun Microsystems. It will be recognized by one of ordinary skill in the art that the present invention may be used with other development environments without loss of generality, such as Microsoft Visual C/C++.

Java is a programming language similar to the object-oriented language C++, and consists of runtime libraries. These libraries provide a standard set of facilities for manipulating the user interface, communicating across a network, etc. Two Java runtime libraries, remote method invocation (RMI) and and Java native interface (JNI) allow a single application to run on multiple hardware platforms without modification.

Java preferably isolates applications from both hardware and operating systems. Unlike traditional computer programs, which are almost always compiled for a hardware platform using tools that preclude their running on anything else, Java applications can be designed to run on any system that has a Java Virtual Machine (VM), also known as a Java Runtime Engine. The VM takes Java byte code and transforms it on the fly into instructions that can be executed by the PC. The same byte code can be interpreted as hardware-level instructions for any other platform with a VM implementation.

Java can be used to create two types of programs: applications and applets. Java applications, like those written in other languages, are standalone programs. They require a VM to run, but this runtime environment may be separate, embedded in the OS or in the application itself. Applets rely on a Web browser with a VM (such as Microsoft Internet Explorer or Netscape Communicator). Since applets are designed to be downloaded, they are also typically much smaller than applications.

In addition to platform independence, Java applications offer several other advantages. First, Java was designed for network computing and makes hiding the differences between local and remote resources easy. This allows Java to be used with thin-client computing, in which most of the processing and storage is handled by a server, while the client is used largely for display and interaction. Typical thin clients include network computers (NCs), which are low-cost personal computers typically connected to a private or public network. Second, the Java programming language has a rigorous object-oriented model that makes it possible to build modular applications. An end user need only download a particular feature of a Java word processor when needed, for example. This dynamic design also lets developers create custom desktop environments that display only those applications required by each end user.

The Java platform or runtime environment is the platform that enables Java applications and applets to run on any system regardless of the operating system and underlying hardware. Rather than compiling code into a format designed for a specific platform, developers compile Java source code into an intermediate form, bytecode, which can be executed on any system with a runtime environment. A Class Loader transfers the Java bytecode to the Java Virtual Machine (JVM). As the heart of the Java platform, the JVM is basically a software CPU that sits between applications and the platform consisting of the operating system and hardware. The JVM interprets bytecode for the platform or uses a just-in-time JIT) compiler to convert the bytecode to machine code for that specific platform. Java class libraries, which are files that make up the standard application programming interface (API) for applications and applets, are also loaded dynamically as needed.

The runtime system, which manages threads, memory, and other system resources, preferably executes the interpreted or machine code on the end platform. The program may be run within a browser as an applet, or as a standalone application.

JavaBeans are reusable building blocks that make up object-oriented Java programs. JavaBeans are defined by an API specification for a visual component architecture based on the Java language. Preferably, any Java components conforming to the JavaBeans component model can be reused in any other JavaBean-compliant application.

Figure 2A:
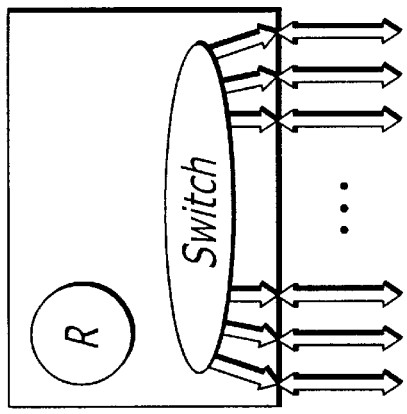
FIG. 2A–2F show alternative network switch configurations compatible with the present invention.
Figure 2B:
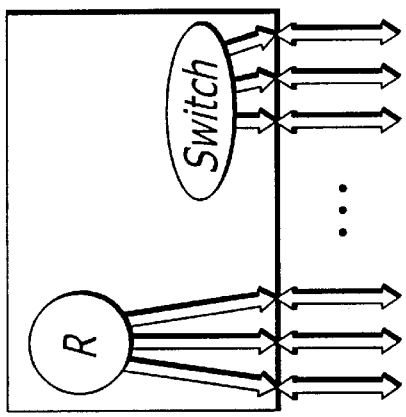
Figure 2C:
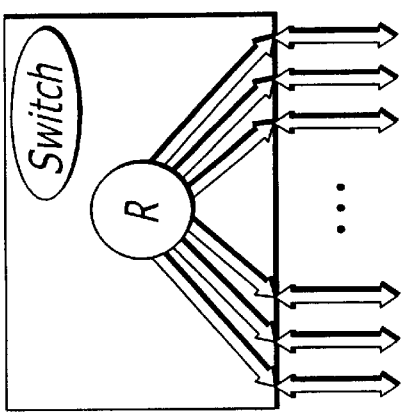
Figure 2D:
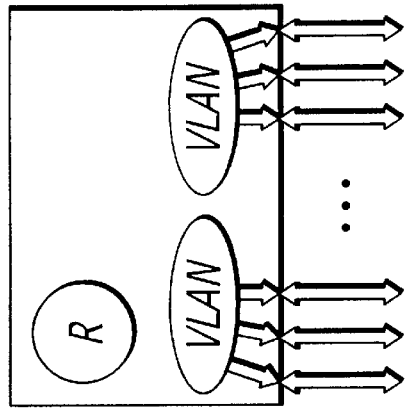
Figure 2E:
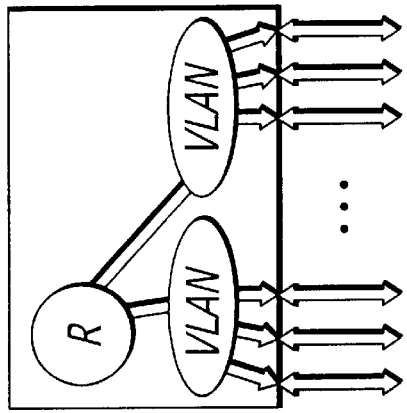
Figure 2F:
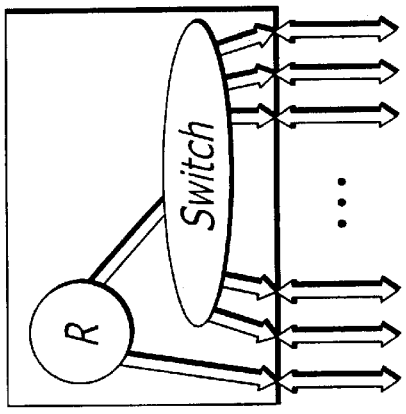

The present invention is used to configure a network switch or other apparatus having a processor and memory which can be modified through software. FIGS. 2A–2F show alternative network switch configurations typically chosen by a network administrator, and which may be automatically configured by the present invention. FIG. 2A shows a L2 switch configuration; FIG. 2B shows a configuration which routes or switches on any port; FIG. 2C shows a configuration which routes on all ports; FIG. 2D shows a configuration which creates virtual local area networks (VLANs) by policy or port; FIG. 2E shows a configuration which routes between VLANs with simple software configurations; FIG. 2F shows a configuration which demonstrates arbitrary network routing and switching. It will be recognized by one of ordinary skill in the art that configurations shown in FIGS. 2A–2F are for illustration purposes only, and that other configurations may be implemented with the present invention without loss of generality. Different applications or users may be assigned different priorities. For example, high level network applications such as real-time network monitoring and two-way voice and video may be given a low priority, equivalent to that of non-critical email or internet browsing. Alternatively, an important user such as a corporate CEO may be given a higher network priority than other employees.

Figure 3:
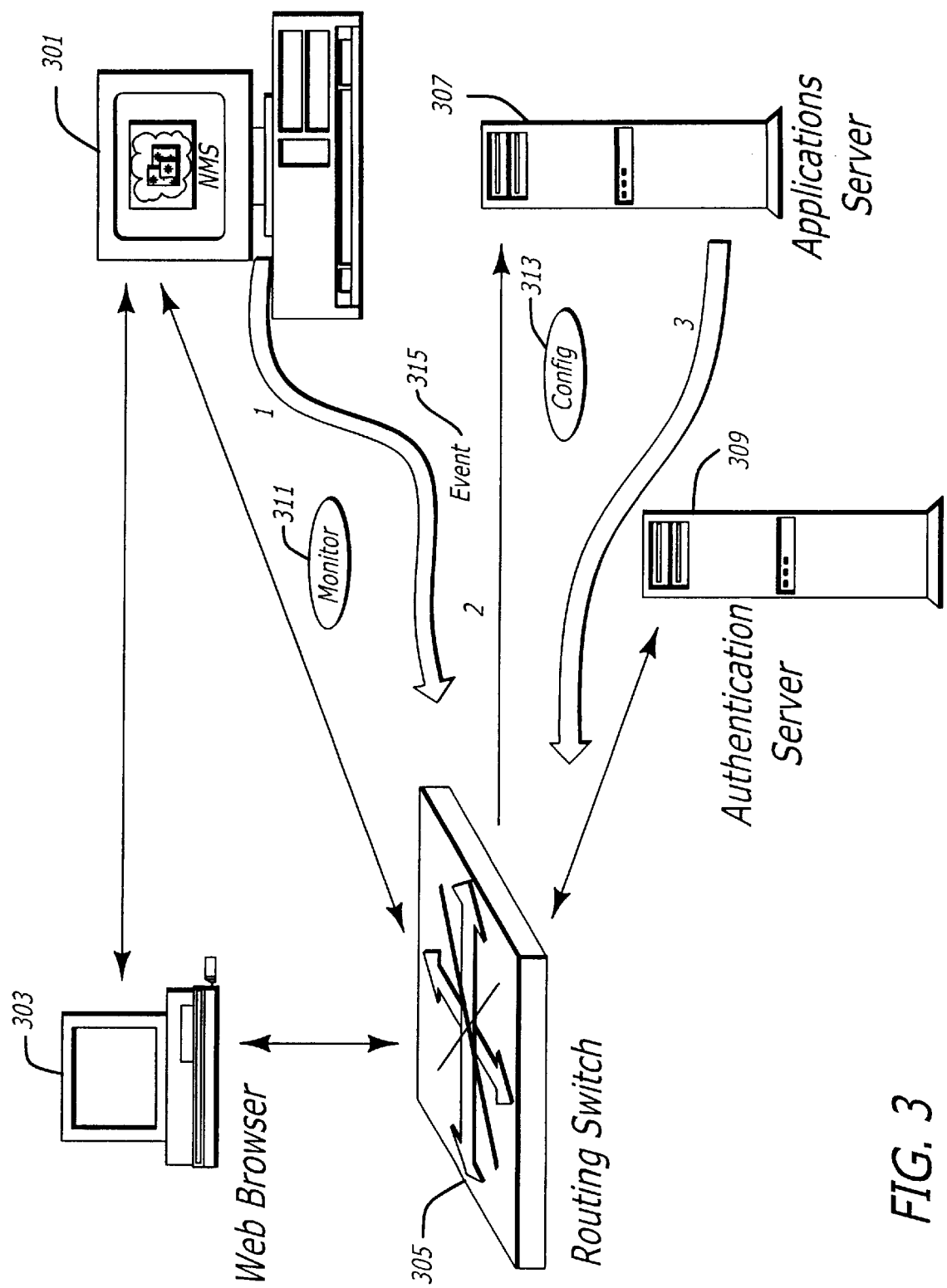
FIG. 3 shows a block diagram of a high level system architecture compatible with the present invention.

FIG. 3 shows a block diagram of a high level system architecture compatible with the present invention. A network maintenance station (NMS) 301 may be coupled to a network routing switch 305 via a maintenance data port on the network switch 305. A preferred personal computer 303 running browser software may optionally communicate with both the NMS 301 and network switch 305. Network monitor software 311 may preferably be downloaded from the NMS 301 to a processor in the network switch 305 for monitoring network data traffic. The monitor software 311 is downloaded through a control data channel, preferably through the maintenance data port on the network switch 305, and not as network traffic being routed through the network switch 305. The use of a control channel preferably does not impact the flow of network traffic through the network switch 305. Once the network monitor software 311 has been downloaded to the network switch 305, events and information 315 relating to network traffic can be uploaded to either the NMS 301 or an applications server 307. Analysis of the network events 315 may be performed either by the processor on the network switch 305 or by the NMS 301 or applications server 307. Analysis of the network events 315 preferably involves monitoring the events 315 to see if they meet one or more of a set of predefined threshold conditions. If so, network configuration software 313 can be downloaded either from the NMS 301 or applications server 307 in reconfigure the network switch 305. An authentication server 309 may optionally be used to authenticate data and actions taking place on the network switch 305.

Figure 4:
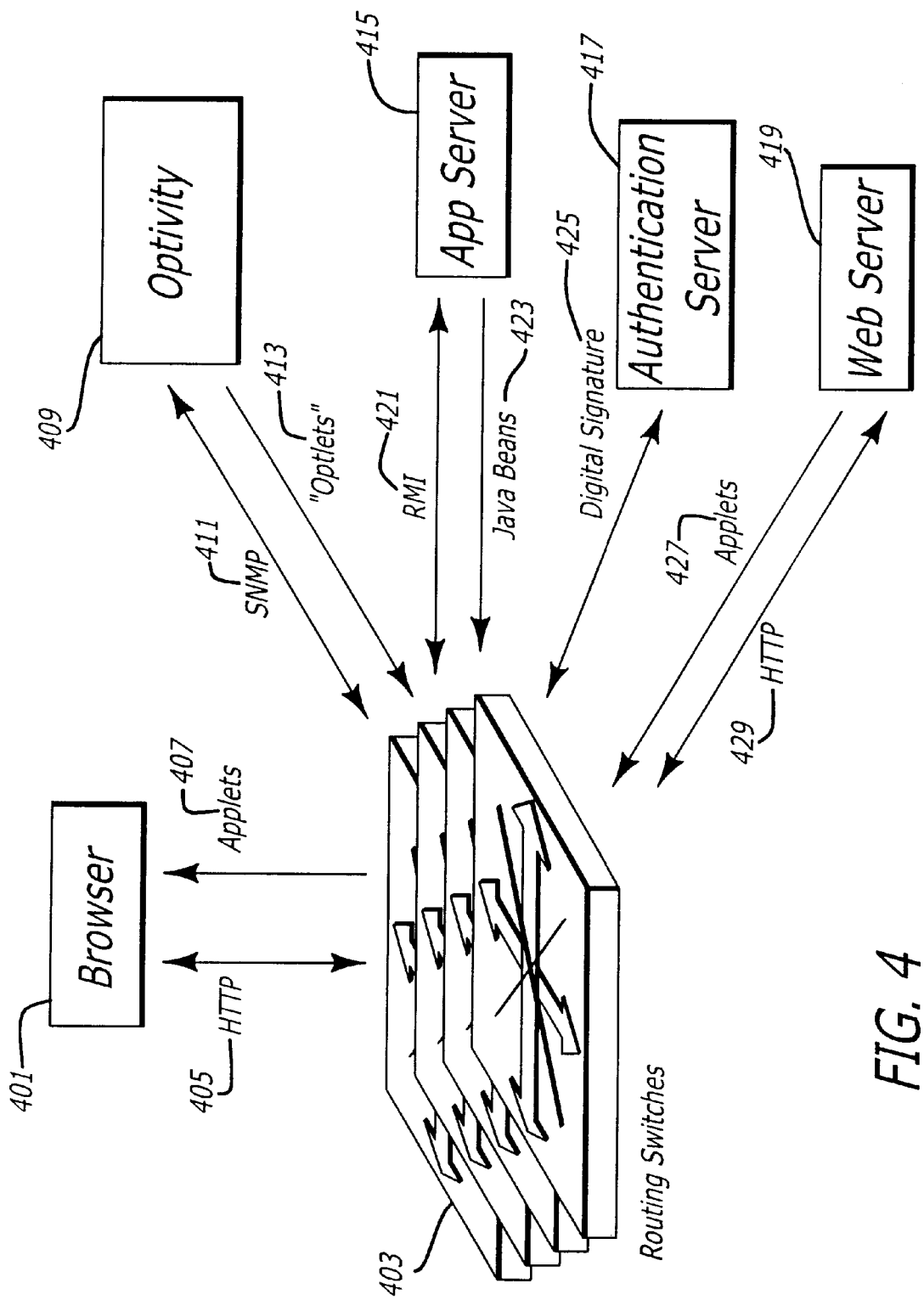
FIG. 4 shows a block diagram of a system architecture and protocol relationships compatible with the present invention.

FIG. 4 shows a preferred system architecture and protocol. Browser software 401 may preferably communicate with a network switch 403 through a variety of protocols, including HyperText Transfer Protocol (HTTP) 405, and may also exchange software applets 407 with the switch 403. Optivity software may preferably communicate with the switch 403 through Simple Network management Protocol (SNMP) 411 or through distributed optivity applications or oplets 409. An application server 415 may preferably communicate with the switch 403 through Remote Method Invocation (RMI) 421 or Java Beans 423.

Figure 5:
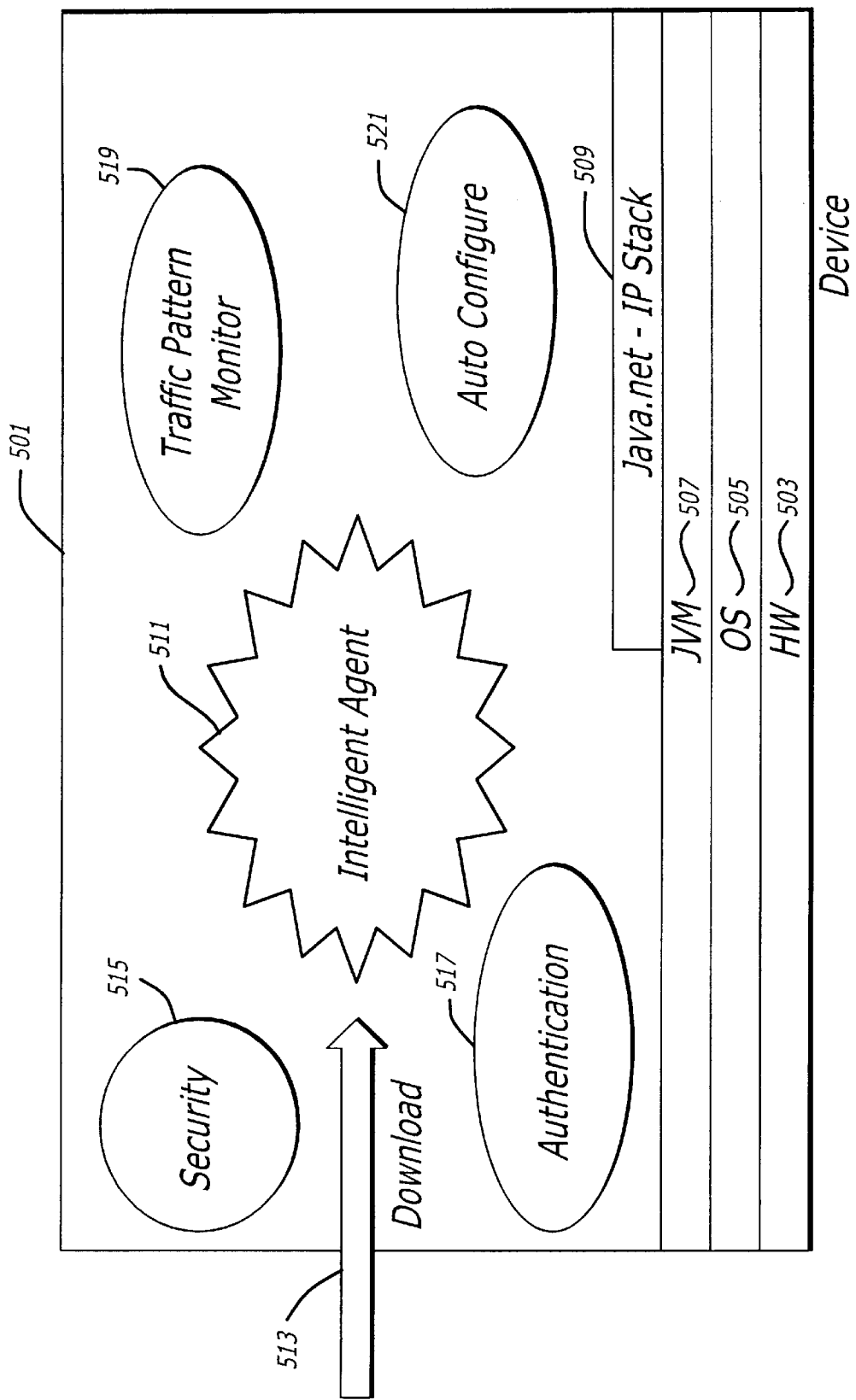
FIG. 5 shows a block diagram of downloading intelligent agents compatible with the present invention.

FIG. 5 shows a preferred method of downloading intelligent agents. A network switch or routing device 501 contains a physical hardware layer 503, preferably including a processor and memory. An operating system 505 runs as a software application on top of the hardware layer 503. An implementation of a JVM 507 and internet protocol (IP) stack 509 runs on top of the operating system layer 505. A download channel 513, typically a maintenance data port, is used to download an intelligent agent 511 to the network switch 501. The intelligent agent 511 typically performs one or more functions, including but not limited to security 515, authentication of information 517, monitoring network data traffic 519, or automatically configuring 521 the network switch 501.

Figure 6:
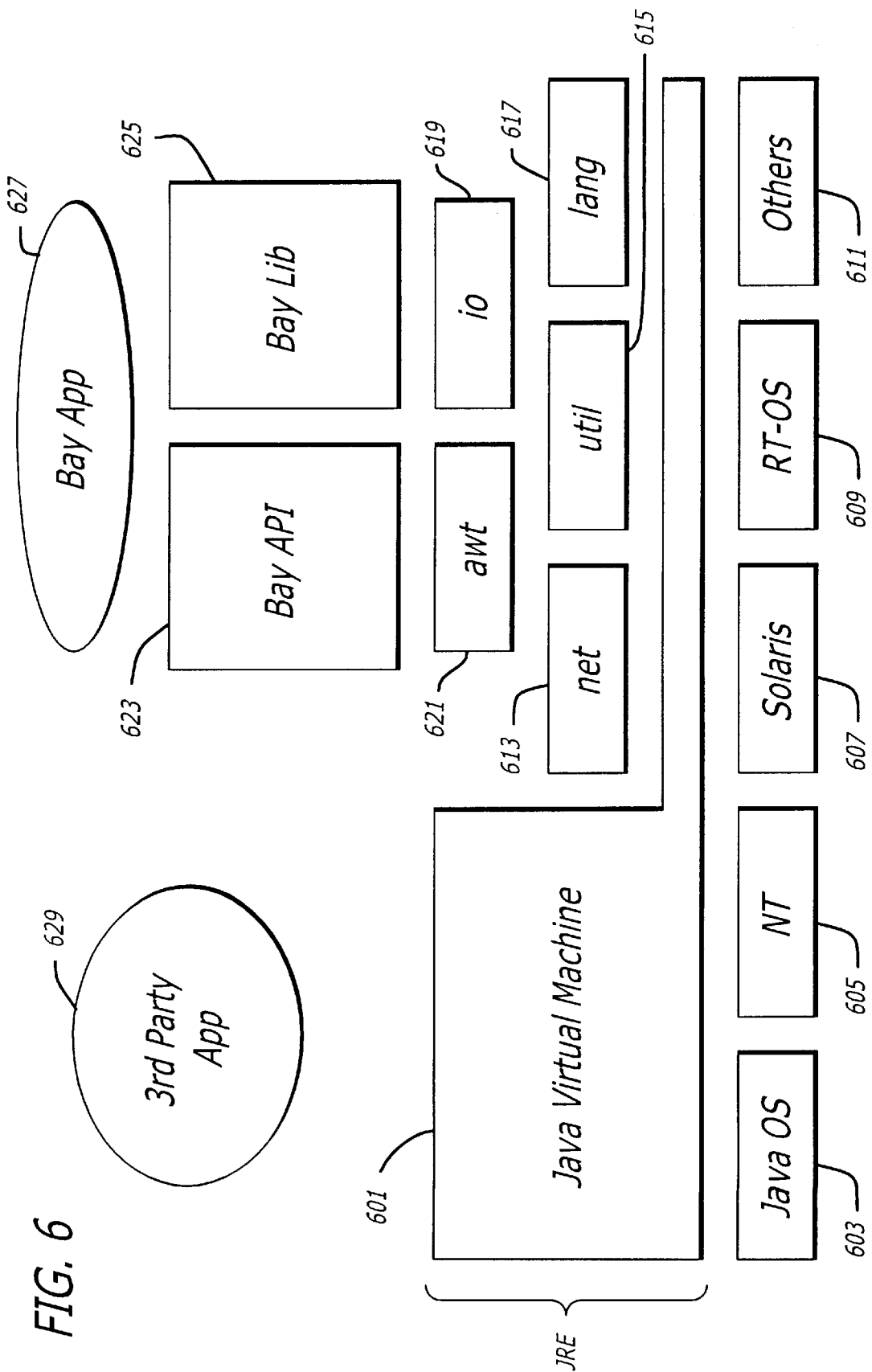
FIG. 6 shows a block diagram of a Java application environment compatible with the present invention.

FIG. 6 shows a preferred Java application environment. A Java virtual machine 601 may run on top of a number of operating systems, including but not limited to JavaOS 603, Windows NT 605, Solaris 607, RT-OS 609, or others 611. System functions such as networking 613, utilities 615, programming languages 617, input/output (I/O) 619, and abstract window toolkit (AWT) 621 are all supported by the JVM 601. A network switch (API) 623 and network switch libraries 625 are used to support end user applications 627 or third party applications 629 running on the network switch.

Figure 7:
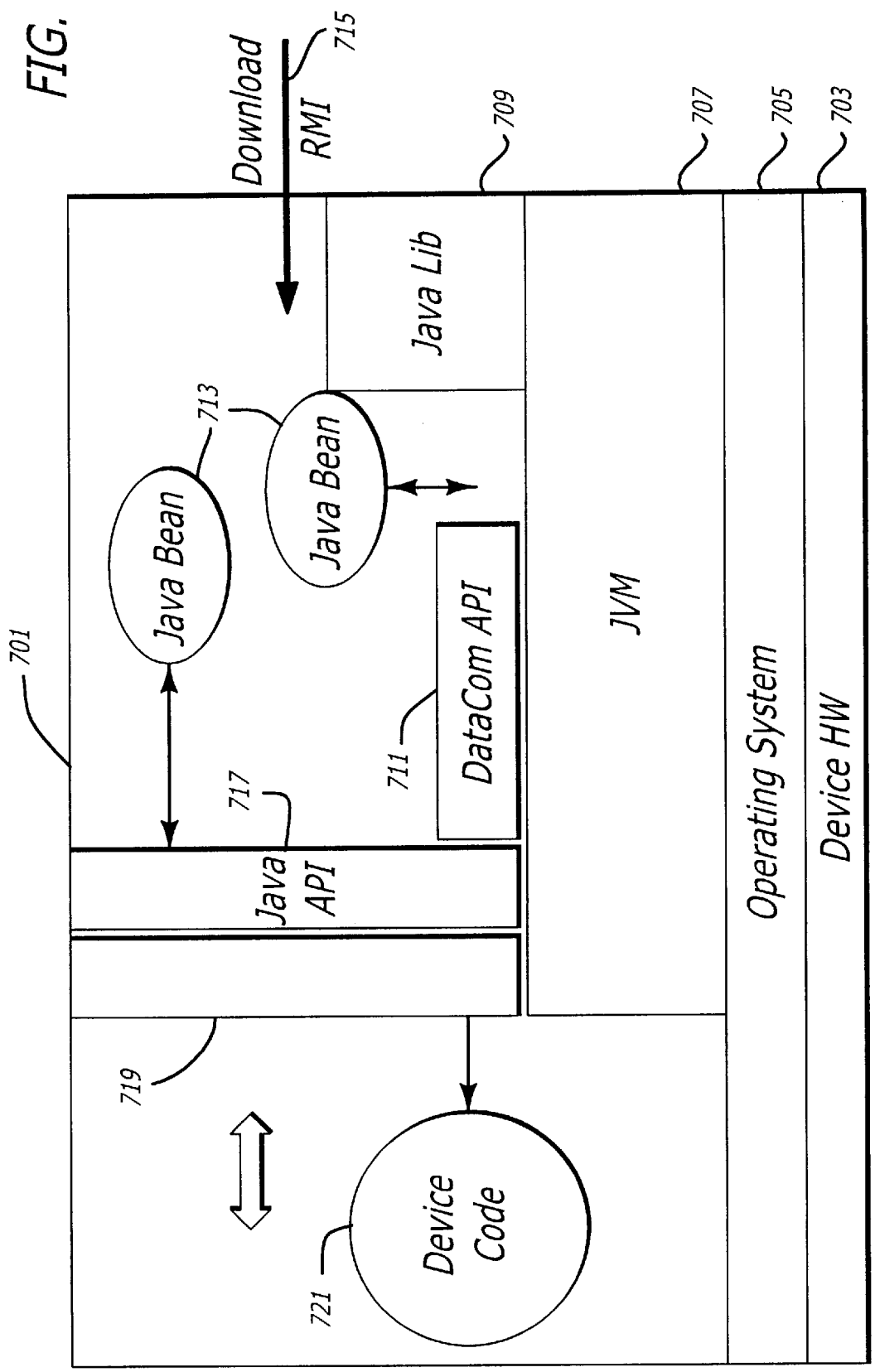
FIG. 7 shows a block diagram of an open system architecture compatible with the present invention.

FIG. 7 shows a preferred open system architecture compatible with the present invention. A network switch 701 includes a hardware layer 703, operating system 705, and a JVM 707. Java software libraries 709 and a data communications API 711 preferably run on top of the JVM 707. A download or control channel 715 is used to download applications programs including Java Beans 713, which communicate with the device 721 through a Java API 717 and a C/C++ API 719.

Figure 8:
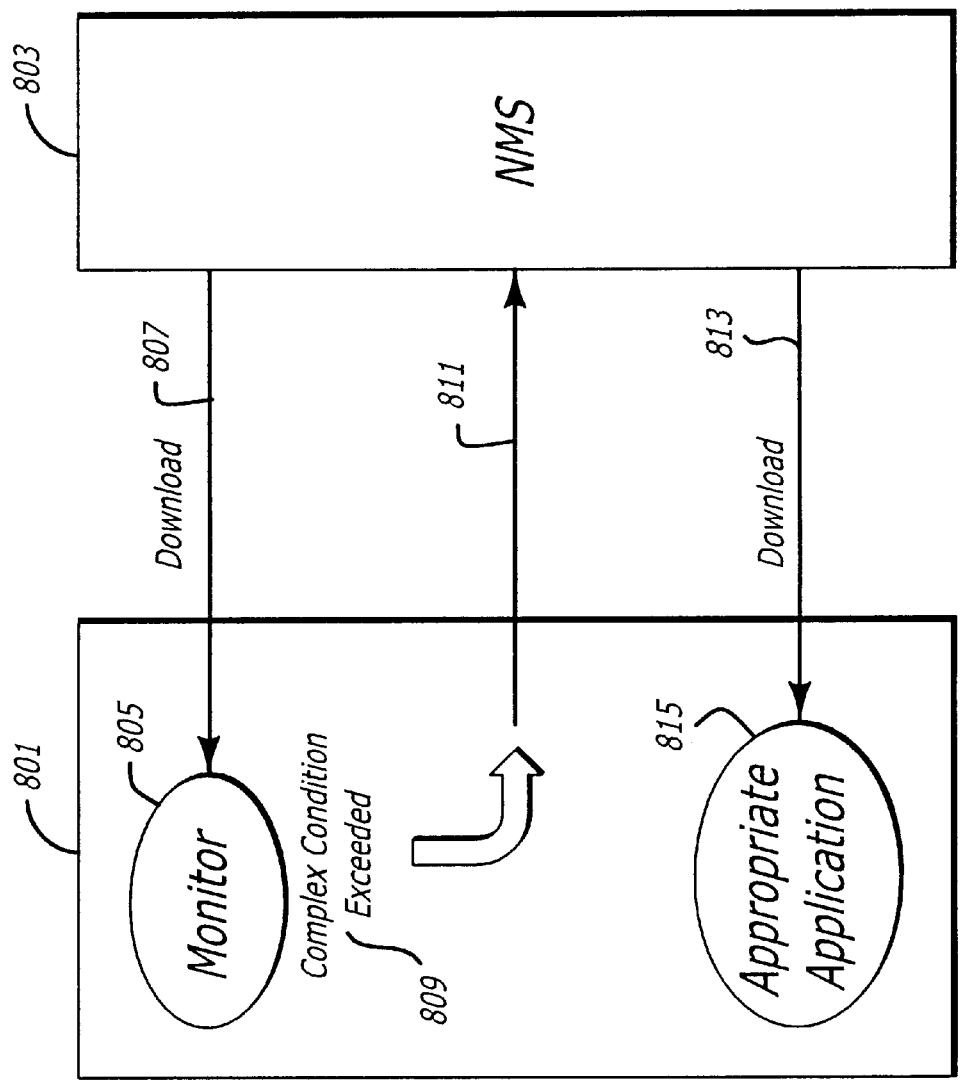
FIG. 8 shows an auto-configuring network switch compatible with the present invention.

FIG. 8 shows an auto-configuring network switch compatible with the present invention. A network switch 801 communicates with a NMS 803 through a download channel 807. Monitor software 805 may be downloaded from the NMS 803 through the download channel 807. If a network event or information meets a threshold condition 809, network information may be optionally uploaded 811 to the NMS 803. An appropriate application 815 may be downloaded 813 from the NMS 803 in response to the uploaded network information.

Figure 9:
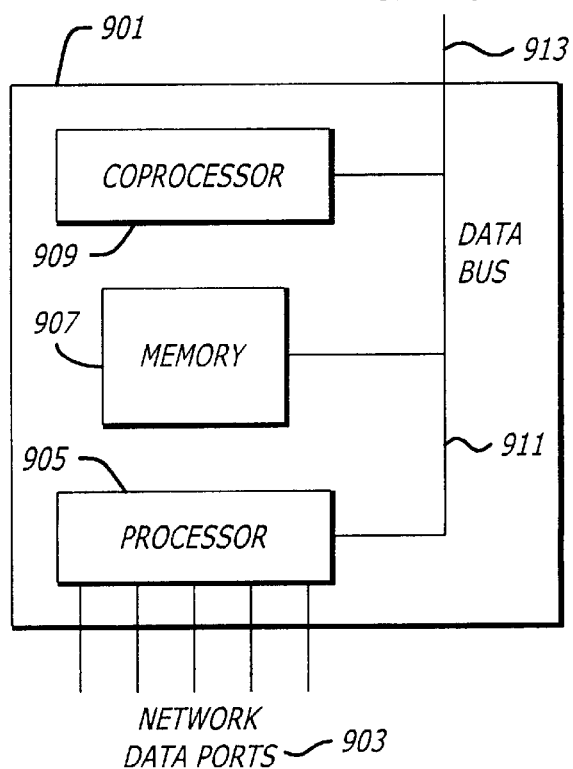
FIG. 9 shows a network switch with coprocessor compatible with the present invention.

FIG. 9 shows a network switch 901 with coprocessor 909 compatible with the present invention. In order not to impact the throughput of data on the network, configuration information is preferably sent through a maintenance port or control channel 913 rather than through the network switch data channel 903, 905. In addition, a coprocessor 909 is preferably used to run monitor and configuration software stored in memory 907 in order not to impact the flow of data through network ports 903 and processor 905. A data bus 911, preferably a PCI data bus, is used to transfer information between the processor 905, memory 907, coprocessor 909, and the maintenance data port 913. It will be recognized by one of ordinary skill in the art that changes may be made in the connections between and the types of processor, memory, and network components without loss of generality. For example, the memory may alternatively be connected directly to both the processor and coprocessor, or a data bus other than a PCI data bus, such as an ISA data bus, used to transfer information internally within the network switch 901.

Figure 10:
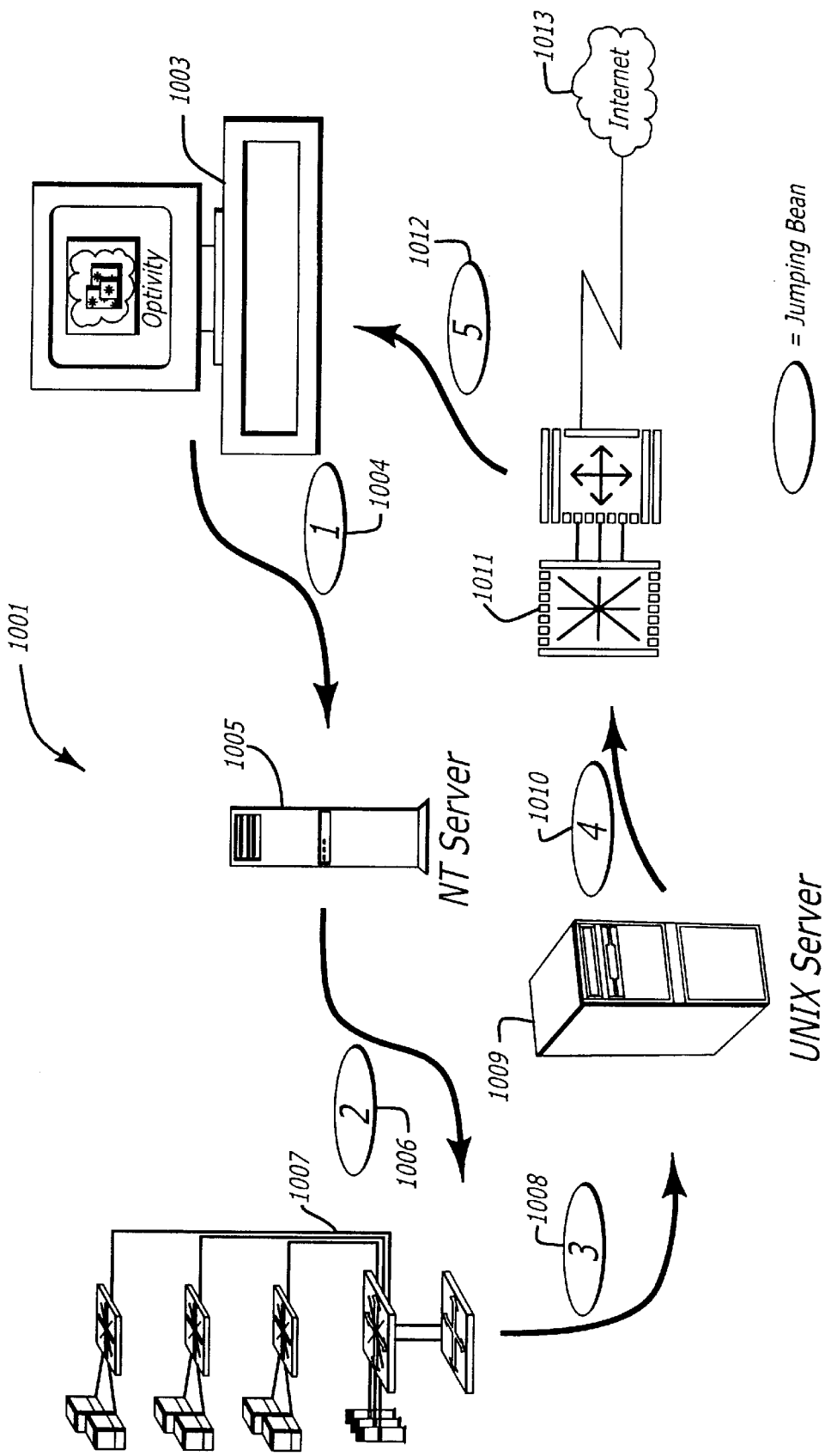
FIG. 10 shows a system diagram of Java mobile agents compatible with the present invention.

FIG. 10 shows a system diagram of Java mobile agents compatible with the present invention. A network 1001 containing optivity software running on a NMS 1003 communicates via Java mobile agents 1004 with a file server 1005, which in turn may communicate via transferred agents 1006 with a network switch 1007. The network switch 1007 may use transferred agents 1008 to communicate with another file server 1009, which uses transferred agents 1010 to communicate with a public network 1013 such as the internet via gateway 1011. Finally, the transferred agents 1012 may be used to communicate with the NMS 1003.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A network apparatus comprising:
   an external network data port;
   a processor coupled to external network data port;
   a data bus coupled to the processor;
   a memory coupled to the processor and the data bus to store data and program instructions;
   a maintenance data port coupled to the data bus; and
   a coprocessor coupled to the data bus to monitor a flow of network data through the external network data port, analyze information regarding the flow of network data, and automatically reconfigure the flow of network data supported by the network apparatus in response to the information indicating that a threshold condition, being data prestored within the memory, has been met.

2. The network apparatus of claim 1 wherein the data bus is a Peripheral Component Interconnect bus.

3. A method comprising:

monitoring information related to network traffic data on the external network data port internally within a network switch;

comparing the information with at least one predefined threshold condition; and automatically reconfiguring the network switch if the information meets or exceeds the at least one predefined threshold condition by transferring information into the internal memory through a maintenance data port.

4. The network apparatus of claim 1 wherein the maintenance data port is coupled to an external network maintenance station.

5. The network apparatus of claim 1 further comprising a set of monitor program instructions stored in the memory and executed by the coprocessor.

6. The network apparatus of claim 5 wherein the set of monitor program instructions comprises program instructions transferred to the memory through the maintenance data port from an external network maintenance station.

7. The network apparatus of claim 1 further comprising a set of network configuator program instructions stored in the memory and executed by the coprocessor.

8. The network apparatus of claim 7 wherein the set of network configuator program instructions comprises program instructions transferred to the memory through the maintenance data port from an external network maintenance station.

9. The network apparatus of claim 1 wherein the processor transfers monitor information through the maintenance data port to an external network maintenance station.

10. A method for configuring a network switch having an external network data port, a maintenance data port, processor, memory, data bus, and coprocessor, the method comprising:

loading software for use by the coprocessor to monitor network data traffic through the maintenance data port;

monitoring network data traffic on the external network data port by the coprocessor;

comparing the network data traffic to at least one predefined threshold condition; and automatically configuring the network switch with the coprocessor if the network data traffic meets the at least one predefined threshold condition.

11. The method of claim 10, wherein the loading of the software further comprises transferring a set of monitor program instructions to the memory through a maintenance data port from an external network maintenance station.

12. The method of claim 10 further comprising transferring a set of network configurator program instructions to the memory through a maintenance data port from an external network maintenance station.

13. The method of claim 10 further comprising uploading monitor information about the network data to an external network maintenance station through a maintenance data port.

14. The method of claim 10 wherein the act of automatically configuring the network switch comprises configuring the network switch in response to instructions received from the coprocessor.

15. The method of claim 10 wherein the act of automatically configuring the network switch comprises configuring the network switch in response to instructions received from an external network maintenance station through a maintenance data port.

16. The method of claim 3 wherein the reconfiguring of the network switch includes transferring Java bytecode to a Java Virtual Machine loaded in the network switch; and converting the Java bytecode into machine code executed by the network switch.

* * * * *